United States Patent
Povalyayev et al.

(10) Patent No.: US 9,349,022 B2
(45) Date of Patent: May 24, 2016

(54) PROVIDING INTEGRATED ROLE-BASED ACCESS CONTROL

(71) Applicants: Viktor Povalyayev, Palo Alto, CA (US); Senthil Chinnathambi, Fremont, CA (US); David Hu, Palo Alto, CA (US); Lata Krishnamohan, Palo Alto, CA (US)

(72) Inventors: Viktor Povalyayev, Palo Alto, CA (US); Senthil Chinnathambi, Fremont, CA (US); David Hu, Palo Alto, CA (US); Lata Krishnamohan, Palo Alto, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/504,321

(22) Filed: Oct. 1, 2014

(65) Prior Publication Data
US 2016/0098572 A1    Apr. 7, 2016

(51) Int. Cl.
*G06F 21/62* (2013.01)
*H04L 29/06* (2006.01)

(52) U.S. Cl.
CPC .......... *G06F 21/6218* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 2002/0077803 A1* | 6/2002 | Kudoh | ................ | G06F 21/6218 704/1 |
| 2004/0019799 A1* | 1/2004 | Vering | ................ | G06F 21/6218 726/1 |
| 2008/0082646 A1* | 4/2008 | Shenfield | ................ | H04L 67/04 709/223 |
| 2010/0192220 A1* | 7/2010 | Heizmann | ........... | G06F 11/3664 726/19 |
| 2011/0277017 A1* | 11/2011 | Ivanov | ................ | G06F 21/6218 726/4 |
| 2011/0302310 A1* | 12/2011 | Diachina | ............. | H04L 63/0263 709/225 |
| 2012/0159567 A1* | 6/2012 | Toy | ........................ | G06Q 10/00 726/1 |
| 2014/0007222 A1* | 1/2014 | Qureshi | .................. | G06F 21/10 726/16 |
| 2014/0337926 A1* | 11/2014 | Shannon | ................ | H04L 67/125 726/4 |
| 2015/0242531 A1* | 8/2015 | Rodniansky | ...... | G06F 17/30917 707/782 |

* cited by examiner

*Primary Examiner* — Hadi Armouche
*Assistant Examiner* — Malcolm Cribbs
(74) *Attorney, Agent, or Firm* — Fountainhead Law Group PC

(57) ABSTRACT

An example method includes, identifying a request from a user associated with a user role. The request corresponds to: an application request to access a first module in an enterprise application; and a data request to access a first portion of a database through the first module. The method also includes: responsive to a first determination that, based on the user role, the application request by the user is permissible: granting the application request; and responsive to a second determination that, based on the user role, the data request by the user is permissible: granting the data request to access the first portion of the database through the first module. The user role is associated with a plurality of access permissions, each specifies: an exhaustive set of application requests permitted to the user role; and an exhaustive set of data requests permitted to the user role.

19 Claims, 6 Drawing Sheets

| Role name | Permissible SPCs (Database level access control) | Data visibility (Database level access control) | Permissible application action (Application level access control) |
|---|---|---|---|
| Compliance expert | clnt_create() | Table 1 | Read access in compliance module |
|  | clnt_create_timed() | Table 1 | Read access in global trade app (all modules) |
|  | svc_create() | Table 1 | Write access in global trade app (all modules) |
| Auditor | clnt_call() | Table 2 | Over-write other users' data in global trade app (all modules) |
|  | clnt_create() | Table 2 | Write access in auditing module |
|  | clnt_update() | Table 2 | Write access in auditing module |
|  | clnt_delete() | Table 3 | Read access to log files on client device |
| Fraud detection analyst | clnt_select() | Table 4 | Read & write access in fraud detection app |

502 Identify a request from a user associated with a user role

504 The request corresponds to:
    (i) an application request to access a first module in an enterprise application; and
    (ii) a data request to access a first portion of a database through the first module;

---

506 Responsive to a first determination that, based on the user role, the application request by the user is permissible:
    508 grant the application request to access the first module in the enterprise application.

---

510 Responsive to a second determination that, based on the user role, the data request by the user is permissible:
    512 grant the data request to access the first portion of the database through the first module.

514 The user role is associated with a plurality of access permissions; and each access permission in the plurality of access permissions specifies:
    (1)    an exclusive set of application requests permitted to the user role; and
    (2)    an exclusive set of data requests permitted to the user role.

PROVIDING INTEGRATED ROLE-BASED ACCESS CONTROL

BACKGROUND

Role-base access control is important. For example, on an application level, to ensure data security, a MICROSOFT WINDOWS administrator (e.g., user Tom) may have privileges to modify (e.g., delete) files created by other regular users (e.g., users Jane and Jerry); but not vice versa. For another example, on a device level, to control content access, a parent may restrict content his/her children can review on a smart TV.

Difficulties abound, however. One technical problem is that, application level and device level role-base access controls are often detached from those at a database level, and thus rendered either unenforceable or inapplicable. For example, a front-end data processing application (e.g., a HR management software application) may be developed independently (e.g., provided by vendor 1) from a backend database (e.g., provided by vendor 2); As a result, user roles (e.g., an HR manger, a full time employee, a part time intern) defined and implemented in the HR management application may not be able to support access control to the backend employee information database.

In fact, for ease of integration, different user roles defined in the front-end data processing application sometimes share the same database access privileges (e.g., those granted to a database system admin).

These approaches may be problematic: database level access controls become highly dependent on application level access controls, rendering the backend database susceptible to breaches.

There is therefore a need for improved techniques to provide integrated role-based access control.

DETAILED DESCRIPTION

The implementations described herein provide various technical solutions to improve data security and integration security between an enterprise application and a backend database, and in particular to the above-identified technical problems—by (1) using an exhaustive list of access permissions for determining whether to grant access and (2) a user role with combined access permissions specified on both application level and database level.

Additional details of implementations are now described in relation to the figures.

Figure 1:
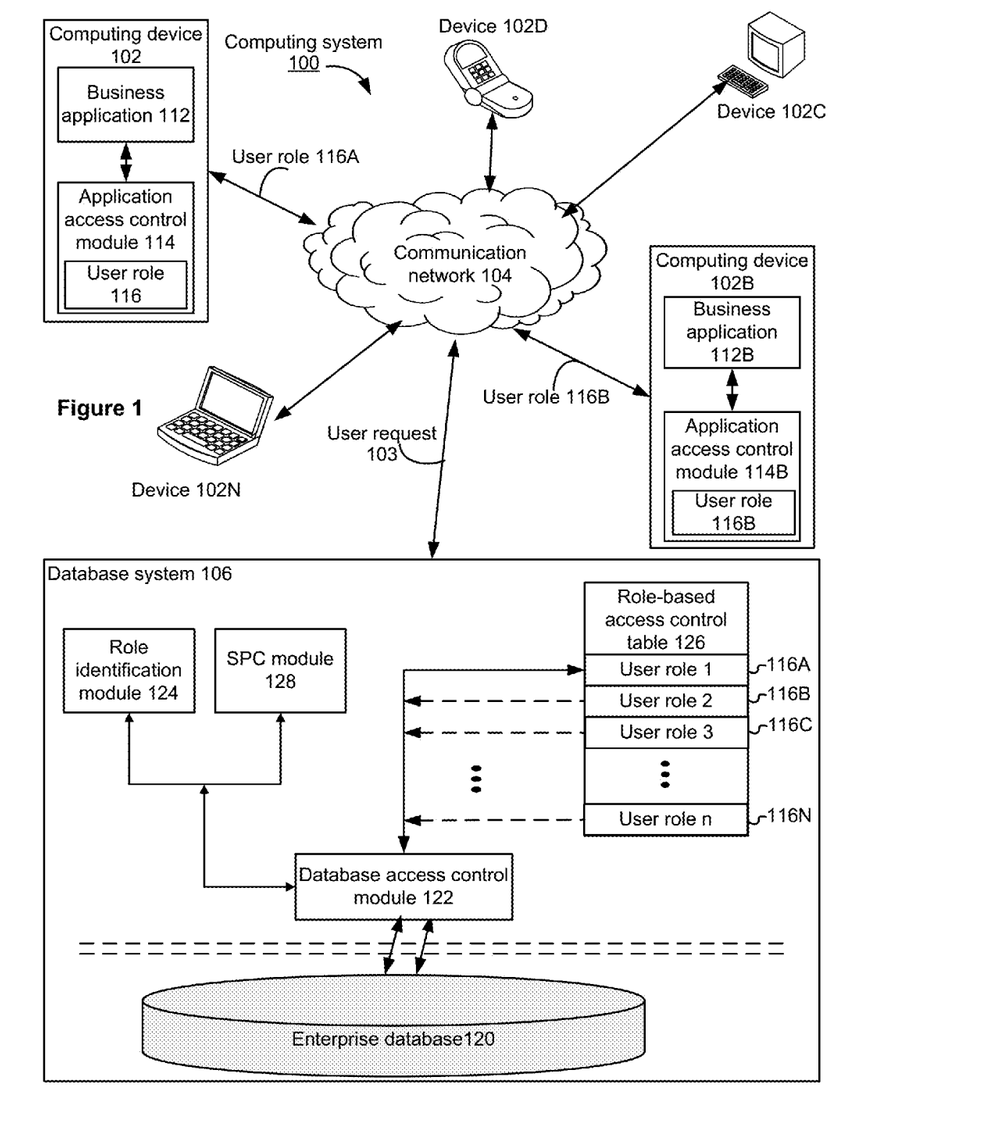
FIGS. 1-2 are example block diagrams illustrating various computing systems for providing integrated role-based access control, in accordance with some implementations.

FIG. 1 is an example block diagram illustrating a computing system 100 for providing integrated role-based access control, in accordance with some implementations.

In some implementations, the computing system 100 includes one or more computing devices 102 (e.g., 102A, 102B, 102C, 102D, . . . , and 102-N), a communication network 104, and a database system 106.

In some implementations, a computing device 102 enables a user to interact with one or more business applications resident thereon, which in turn communicate with the server system 106, e.g., the enterprise database 120.

In some implementations, the computing device 102 obtains user requests 103 in a business application and determines whether a user request (to change another user's business transaction history in an auditing module in a regulation management application.) is permissible (e.g., on the application level), e.g., whether a user can access the audit module.

In some implementations, the computing device 102 is a mobile computing device, such as a laptop computer, a notebook computer, a smart phone, or a tablet computer. In some implementations, a computing device 102 is a (e.g., light weight) client device (also referred to herein as client 102). In some implementations, the business application 112 is an APPLE IPHONE application (or app) or a GOOGLE ANDROID app.

In some implementations, the computing device 102 includes a business application 112, an application access control module 114, and a user role 116.

In some implementations, the business application 112 is an enterprise resource planning (ERP) application, an enterprise access control application, an enterprise access control violation management application a regulation management application, an enterprise process control management, an enterprise fraud detection management application, an enterprise risk management application, an enterprise data processing application, an enterprise travel planning and expense reimbursement application, an enterprise data management (EDM) application, or an enterprise feedback management (EFM) application.

In some implementations, a business application 112 includes a plurality of functional module, such as a fraud detection module, a fraud investigation module, a statistics module, and a resolution module.

In some implementations, the application access control module 114 determines, based on a user's role 116, whether a user request is permissible on the application level. For example, in accordance with a role-based access control table (e.g., reside on the computing device 102, but similar to the role based access control table 126 on the database system 106) or a portion thereof, the application access control module 114 determines that a fraud detection analyst (e.g., a user's role) can access a fraud investigation module within a fraud detection application, but cannot access a compliance check list module within a compliance application. For another example, in accordance with the server side role based access control table 126 (on the database system 106) or a portion thereof, the application access control module 114 determines that an auditor has both read and write accesses to all modules within an audit application, but a compliance analyst has read, but not write, access to the reporting module within the audit application.

When a user request is permissible on the application level, the computing device 102 transmits to the user request to the server system 106, which determines whether the request is permissible on the database level, e.g., whether the user can change the data (e.g., write access) in the enterprise database 120, so as to modify the other user's business transaction history.

When a user request is not permissible on the application level, the computing device 102 notifies the user the same, without transmitting to the user request to the server system 106. For example, in an HR management application, when a part time student intern attempts to access salary information of other full time employees, the computing device 102 denies such attempt, and optionally logs these failed attempts in a log file for future inspection.

In some implementations, the communication network 104 interconnects one or more computing devices 102 (with each other, and with the database system 106). In some implementations, the communication network 104 optionally includes the Internet, one or more local area networks (LANs), one or more wide area networks (WANs), other types of networks, or a combination of such networks.

In some implementations, the database system 106 selectively provides data responsive to a user request e.g., received from a computing device 102. In some implementations, the database system 106 is a computing cloud (or a portion thereof) that processes user requests from a plurality of computing devices 102 (e.g., mobile or otherwise).

In some implementations, the database system 106 includes a database access control module 122, a role identification module 124, a role-based access control table 126, and a stored procedure call (SPC) module 128.

In some implementations, the database access control module 122 determines, e.g., using information stored in a role-based access control table (e.g., on the computing device 102 or on the database system 106), whether a user request is permissible on the database level, e.g., whether a use can modify data in a data table based on the user's role. For example, the database access control module 122 may allow an HR manager to modify a full time employee's salary and benefit package, but prohibit an intern from doing the same.

In some implementations, the role identification module 124 identifies the role of a user who initiated a user request, e.g., based on information associated with the user request. In some implementations, a user request is associated with (e.g., includes) a user identifier (e.g., an employee ID, a user ID, or a system login name), and the role identification module 124 identifies a user's role based on the user identifier, e.g., whether a user is an HR manager, an engineering team leader, an auditor, a fraud detection analyst, or a compliance expert. In some implementations, the role identification module 124 provides information representing a user's role to the database access control module 122, which can then determine whether to allow a user request in accordance with the user's role.

In some implementations, the role-based access control table 126 specifies one or more user roles (e.g., the user roles 116A, 116B, 116C, . . . , 116N) and corresponding access privileges (e.g., on both the application level and the database level).

In some implementations, the stored procedure call (SPC) module 128 issues stored procedure calls to the enterprise database 120 in accordance with a user request, e.g., opening or closing a connection to an enterprise database, and writing or reading data from a specific table in the enterprise database.

In some implementations, the enterprise database 120 stores and manages data for one or more business (e.g., enterprise) applications. In some implementations the enterprise database 120 stores business data, such as sales/business expenses/revenues, customer profiles, and supplier profiles.

In some implementations, the enterprise database 120 manages data stored thereon in accordance with user requests 103, e.g., updating a data table in accordance with a write request or providing data responsive to a read request. In some implementations, the enterprise database 120 includes one or more databases, for example, a MICROSOFT SQL Server database, an Oracle database, or a SYBASE database.

Figure 2:
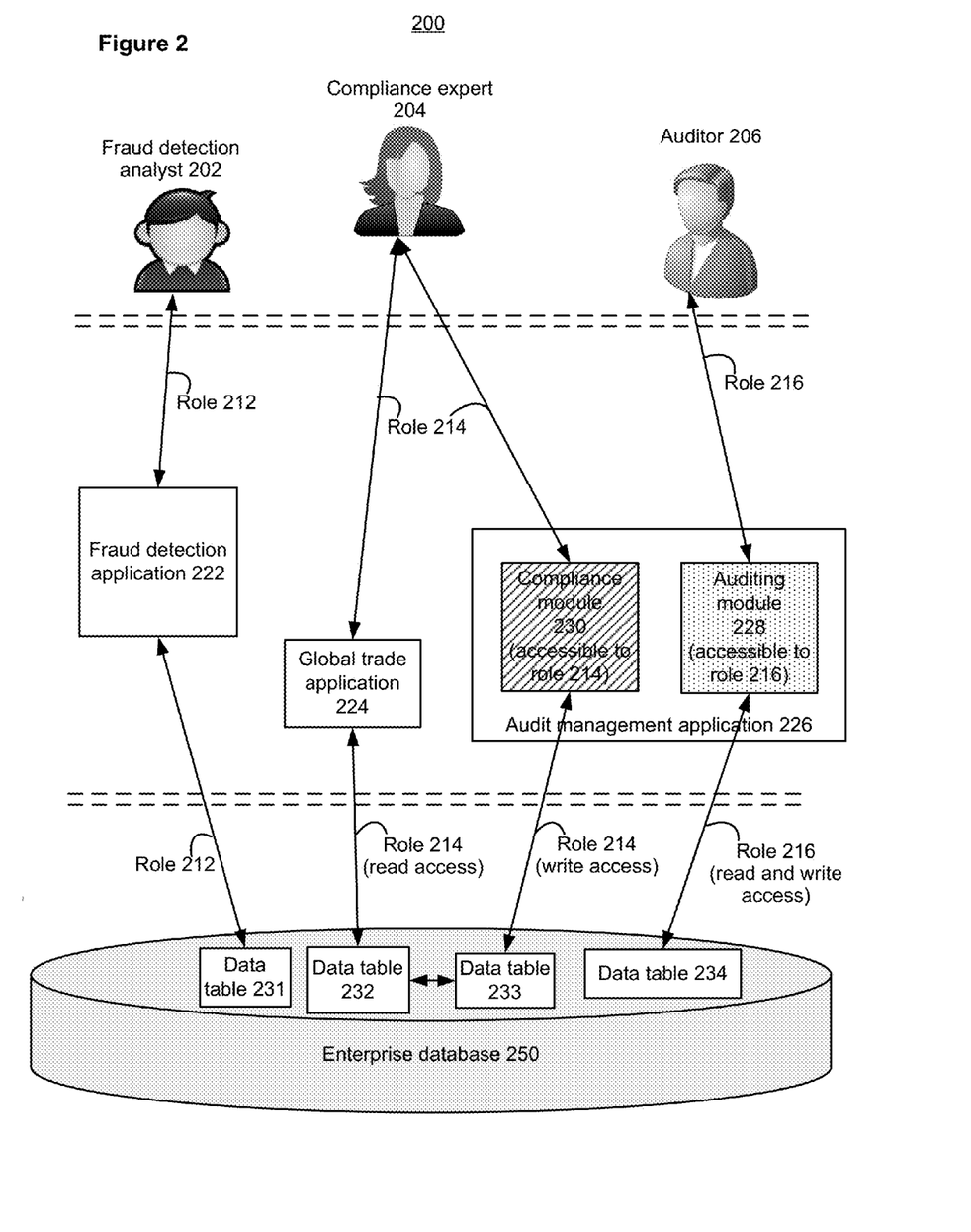

FIG. 2 is an example block diagrams illustrating a computing system for providing integrated role-based access control, in accordance with some implementations.

As shown in FIG. 2, in some implementations, the user 202 is a fraud detection analyst (the role 212).

On the application level, based on the role 212 (e.g., that of a fraud detection analyst, the user 202 is permitted to access all modules (e.g., a detection module, an investigation module, and a resolution module) in a fraud detection application (e.g., for detecting fraudulent credit card transactions). Because in some cases, a fraud detection analyst should be able to prosecute a potential fraud case from the beginning (e.g., detection) to the end (e.g., resolution).

On the database level, based on the role 212 (e.g., that of a fraud detection analyst), the user 202 is allowed to (e.g., both read and write) access to data table 231 within the enterprise database 250, e.g., via the fraud detection application 222. Because in some cases, a fraud detection analyst is responsible for not only reviewing (e.g., reading) information concerning a case (e.g., to report to higher level managers), but also updating information in the case (e.g., to show investigation process).

As also shown in FIG. 2, in some implementations, the user 204 is a compliance expert (the role 214).

On the application level, based on the role 214 (e.g., that of a compliance expert), the user 204 is permitted to access all modules within the global trade application 224, and the compliance module 230—but not the auditing module 228—within the audit management application 226.

On the database level, correspondingly, based on the role 214 (e.g., that of a compliance expert), the user 204 is permitted to read the data table 232 (e.g., review, but not modify, financial transactions within the global trade application 224) and write the data table 233 (e.g., update compliance check lists based on review of transactions recorded in the global trade application 224). As shown in FIG. 2, the data tables 232 and 232 include overlapping data (e.g., a common column A), and as a result, the user 204 is able to access shared data (e.g., the common column A) between the datable 232 and the data table 233, through the compliance module 230 within the audit management application 226, but not through the global trade application 224 (or a module therein). These techniques are advantageous, as they provide an application specific database access. For example, a user, through her role as a compliance expert, may access the financial transaction data through an audit application, but not thought the trade application, in order to comply with legal requirement (e.g., modifications to past stock option transactions, such as back dating, must be verified against compliance rule first, before it is finalized) and professional duties (e.g., a lawyer cannot trade stocks of a client company unless such trades are authorized first by a law firm compliance officer).

As still shown in FIG. 2, in some implementations, the user 206 is an auditor (the role 216).

On the application level, based on the role 216 (e.g., that of an auditor), the user 206 is permitted to access the auditing module 228—but not the compliance module 230—within the audit management application 226.

On the database level, correspondingly, based on the role 216 (e.g., that of an auditor), the user 206 is permitted to both read from and write to the data table 234 (e.g., review and update compliance results within the audit management application 226). For example, an outside auditor may have access to data (e.g., the table 234) for external auditing purpose, but not to internal data (e.g., the table 233) that may be considered confidential for internal compliance purpose only.

Figure 3:
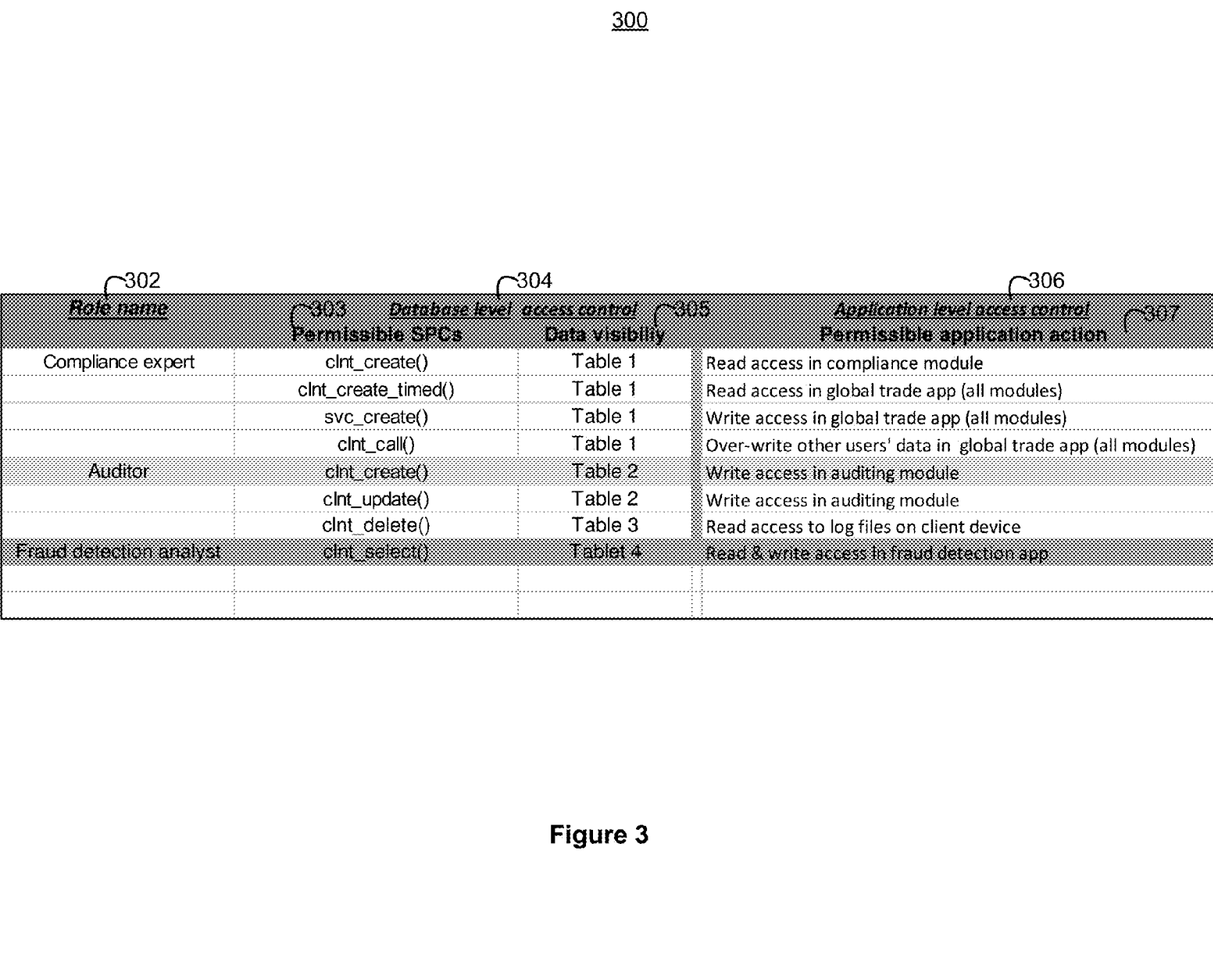
FIG. 3 is an example block diagrams illustrating an access control table for providing integrated role-based access control, in accordance with some implementations.

FIG. 3 is an example block diagrams illustrating an access control table 300 for providing integrated role-based access control, in accordance with some implementations.

In some cases, an access control table 300 specifies a role name 302, its corresponding database level access privileges 304, and its corresponding application level controls privileges 306. In some implementations, a database level access privilege 304 specifies (1) permissible database stored procedure calls (permissible SPCs) and (2) data visibility; an application level access privilege 306 specifies privilege per module within an application.

For example, a user associated with a role of a compliance expert can create a connection with the table 1, and has read and write access in the compliance module of a compliance application.

For another example, on the database level, an auditor can create a connection with (e.g., access) and update data in table 2; on the application level, au auditor can have write access to an auditing module in an audit application, but read access (e.g., review) to transaction log files stored on a client device.

For still another example, on the database level, a fraud detection analyst can query data ("SELECT") from table 4 (but not tables 1-3) and have been read and write access to a fraud detection application (e.g., an IPHONE app on a mobile device).

Figure 4:
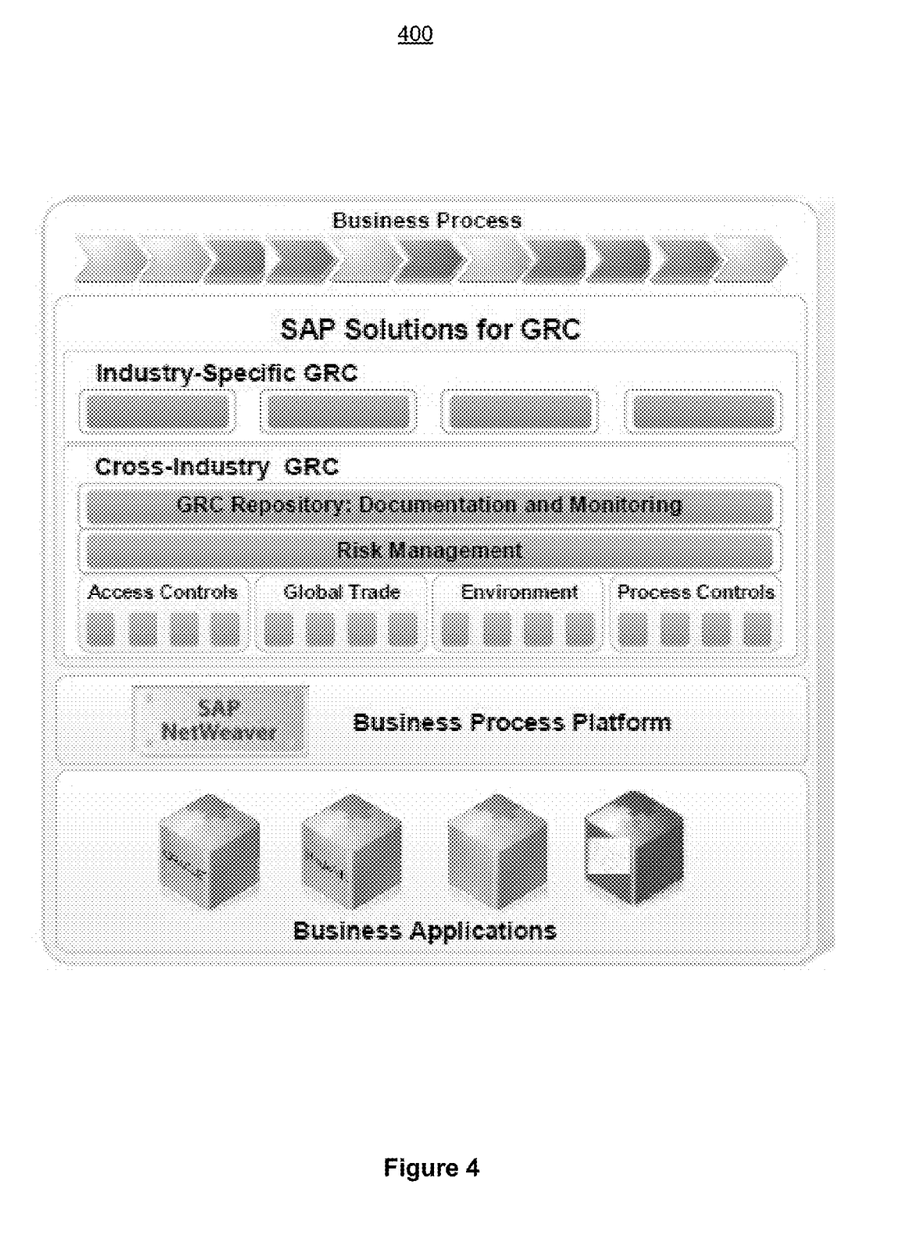
FIG. 4 is an example block diagrams illustrating a platform for providing integrated role-based access control, in accordance with some implementations.

FIG. 4 is an example block diagrams illustrating a system architecture for providing integrated role-based access control, in accordance with some implementations.

As shown in FIG. 4, in some cases, the systems and methods for providing integrated role-based access control are implemented in the architecture shown in FIG. 4.

In some implementations, different aspects of a business process are managed using different business (e.g., enterprise) applications, such as an access control applications, a global trade application, an environment application, and a process control application.

Figure 5:
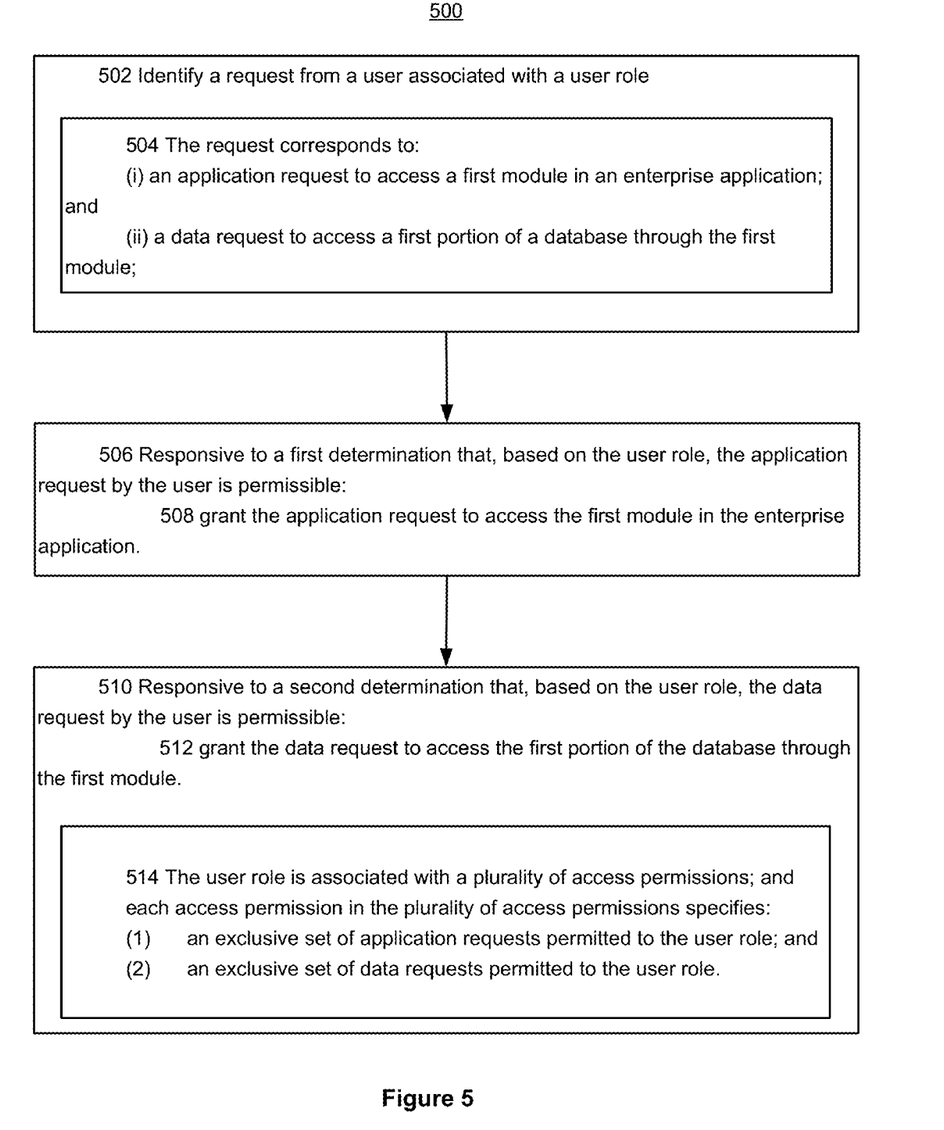
FIG. 5 is an example flow chart illustrating a method for providing integrated role-based access control, in accordance with some implementations.

FIG. 5 is an example flow chart illustrating a method 500 for providing integrated role-based access control, in accordance with some implementations.

In some implementations, the method 500 is implemented at a computing device 102. In some implementations, the computing device 102 is equipped with one or more processors and memory storing one or more programs for execution by the one or more processors. In other implementations, the method 500 is implemented at a server system 106, e.g., a computer that is equipped with one or more processors and memory storing one or more programs for execution by the one or more processors.

In some implementations, the method 300 includes: identifying (502) a request from a user associated with a user role, for example, receiving a request, from a compliance expert (e.g., a user role), to update a compliance checklist using a compliance module (e.g., in the audit management application 226 shown in FIG. 2).

In some implementations, the request corresponds to (504): an application request to access a first module in an enterprise application; and a data request to access a first portion of a database through the first module. For example, the request to update the compliance checklist includes a request to access the compliance module (in order to update the checklist) within the audit application (e.g., an application level access request), and a request to update a database table storing information representing the checklist (e.g., a database level access request).

In some implementations, the method 500 includes, responsive to (506) a first determination that, based on the user role, the application request by the user is permissible: granting (508) the application request. To continue with the above example, if a user has an appropriate role that allows the user to access the compliance module, the request is granted, and the user can update the compliance checklist therein. If the user's role does not afford the user access to the compliance module, the request is denied, and sometime the user notified of the reasons for such denial.

In some implementations, the method 500 proceeds by, responsive to (510) a second determination that, based on the user role, the data request by the user is permissible: granting (512) the data request to access the first portion of the database through the first module. For example, if a user's role allows the user to (e.g., read, write, or both) access a compliance checklist table within an enterprise database, the database access control module 122 allows the data request to go through and corresponding changes applied to the data table.

In some implementations, the user role is associated with (514) a plurality of access permissions, each specifies: an exhaustive set of application requests permitted to the user role; and an exhaustive set of data requests permitted to the user role. For example, using an exhaustive set of access permission to determine whether to grant access is advantageous, as an exhaustive list implies that access requests not specifically or expressly included are excluded. Requiring an access to be expressly granted increase data security.

These techniques are contrast with providing access a backend database to multiple application, by using a single specific user role (e.g., "SYS_ADMIN"), its associated access permissions, and database API stored procedures created in the SYSTEM schema—which poses security risk. Because the latter approaches may grant accesses and authorizations not necessary to a user role. Thus the user also gains accesses outside of GRC that are not necessary to invoke the APIs.

In some implementations, a user request is granted only if the user request corresponds to an access permissions specified in the plurality of access permissions associated with the user role. In some implementations, a user request is denied if the user request does not corresponds to an access permissions specified in the plurality of access permissions associated with the user role.

For example, access requests (e.g., on both the database level and the application level) are allowed only if they are explicitly granted to a user role. For example, if a request is not expressly granted, it is denied. The requirement for express grant of access is advantageous as it may significantly increase data security. For example, the express grant of access may be implemented in a server side access table, which may be more difficult to attack than a client side access table; and without modifying the server side access table, unauthorized access requests are denied.

In some implementations, the user role corresponds to a corporate role of the user in a business organization. For example, a user's role is assigned access privileges based on a user's professional status in a professional organization.

In some implementations, the user role is customized in accordance with a set of business policies associated with a business organization. For example, access permissions configured for a specific user role can be customized to reflect a change in corporate policy (e.g., only HR managers can review salary requirements of other full time employees) or a legal requirements (e.g., external auditors should have access to stock trade taken place within the last year).

In some implementations, the user role is pre-configured for an end-user of the enterprise application. For example, a user role specifies pre-packaged access permissions (e.g., access right or privileges), and an end user does not need to configure access permissions for a role. This is advantageous, because with a structure that includes pre-configured roles and authorizations (and also the use of synonyms instead of the original schema name), these approaches reduce or eliminate exposure (both on the application level and the database level). A customer company can thus automate data protection capabilities in their business application, thereby reduce overall corporate risk exposure. Second, user roles with pre-configured access privileges (e.g., pre-delivered authorizations) do not require configuration or action on a customer company (and end-users therein), thereby reducing setup time (or configuration time) required for an enterprise application to be made available and functional. Third, user roles with pre-configured access permissions also provide scalability. For example, when new versions of a business/enterprise software application are released with additional features, roles, and access permissions, a customer company and end-users therein can quickly take advantage of the newly available pre-configured user roles, without having to perform such administrative tasks.

In some implementations, the user role is unmodifiable by an end-user of the enterprise application. For example, a user role specifies pre-packaged access permissions (e.g., access right or privileges), and an end user cannot modify these pre-packaged permissions, such as adding more access permissions or removing an existing access permission. This is advantageous, because it prevents end-users from changing application and/or database access permission on their own, reducing the risk for data breach or authorization data access.

In some implementations, the data request includes invoking one or more database stored procedure calls, e.g. get first five rows in a datable, or remove non-alphanumeric characters from query results. In some implementations, a database stored procedure call in the one or more database stored procedure calls is invoked through a synonym specified in the data request. For example, in order to reduce database exposure, stored procedure calls are invoked by referring to their synonyms. For example, a data request to "remove_spaces" (a synonym to the procedure call "clean results") are fulfilled by retrieving search results and then invoking the procedure call "clean results" to remove unnecessary spaces from return query results.

In some implementations, an application program interface (API) associated with the database stored procedure call is not directly accessible to the database request. For example, application level data requests do not include, literally, parameters necessary for invoking stored procedure calls. Instead, a mapping table is used for corresponding parameters specified in a data request and those needed to invoke a SPC.

In some implementations, the application program interface (API) associated with the database stored procedure call is accessible to the database request only through a synonym. These approaches are advantageous, as they serve as a security wall between a front end application and a backend database, and thus avoid exposure of APIs to application level data requests, thereby reducing risk of breach into backend database system, even when a front end application has been breached.

In some implementations, the application program interface (API) associated with the database stored procedure call is not accessible by a second user associated with a second user role. For example, an API associated with a role is not accessible to another user role.

In some implementations, the first database schema is associated with a first set of tables, a first set of views, and a first set of stored procedures.

In some implementations, the method further comprises: responsive to a third determination that, based on the user role, the application request by the user is not permissible: denying the application request to access the first module in the enterprise application, without processing the data request to access the first portion of the database through the first module. For example, when a user request fails on the application level, it is database counterpart (the corresponding data request) is not executed (e.g., transmitted to the database system 106 for processing), thereby reducing response time.

In some implementations, the method further comprises: logging the denial of the application request for auditing purpose. For example, application level requests and database level requests are logged, so that they can be reviewed at a later time, e.g., so as to ensure compliance to certain legal and ethical requirements.

In some implementations, the enterprise application and the database are developed independently by different providers. For example, when the enterprise application and the database are developed different engineering teams or vendors, the integration process may need harmonizing (e.g., combining or unifying) user roles for application level requests with those for database request.

In some implementations, the method is implemented in an access control application associated with the enterprise application and the database. For example, access permission determinations are made by an access control application independently from a business application and a backend database, and the access control application is sometimes a stand-alone application that protects data security between a business application and its associated database.

In some implementations, the user role is enabled in a plurality of enterprise application associated with the database. For example, a compliance expert role is granted different access permissions in different business application. For example, as shown in FIG. 2, the compliance expert 204 has one set of access privileges in the audit management application 226 (e.g., reviewing and updating compliance checklists), and a different set of access privileges in the global trade application 224 (e.g., reviewing, but not modifying, trade history).

In some implementations, the first data request is an update or create commend, and the second data request is a read commend. For example, the first client request updates a row in a server database o creates a new row in the server database; the second client request reads the first row from a server database and display data stored therein on a web page, for review by a user.

In some implementations, the computing device is a mobile computing device, and the first data request and the second data request are issued by a mobile application resident on the mobile computing device. For example, the device 102 is a mobile device, such as a smart phone, a smart watch, a tablet, or a laptop; and the data request are issued by a mobile application (e.g., an IPHONE app or a GOOGLE ANDROID app) on the mobile device.

In some implementations, the database system 106 is implemented using n-memory computing techniques, such as an SAP HANA database, where, data are stored in the main random access memory (RAM) of dedicated servers rather than in complicated relational databases operating on comparatively slow disk drives. These techniques are advantageous, as in-memory computing helps enterprise customers, such as business customers, including retailers, banks and utilities, to quickly detect patterns, analyze massive data volumes on the fly, and perform their operations quickly.

In some implementations, the database system 106 is part of a computing cloud, e.g., an SAP HANA cloud, an AMAZON Web Services cloud, an Oracle cloud, or an IBM cloud.

In some implementations, these techniques are applied to an application-database integration process, where a pre-defined user role and its associated access permissions can be harmonized within the system, thereby avoiding separate permission specification on both the application level and the database level.

In some implementations, these techniques provide user roles created at the database layer. In some implementations, these techniques introduce automatic checks and balances into the system to ensure data security that will be most importantly user independent. End-users do not need to create ids, roles and authorizations. Also the inherent risk of an error that may be committed by the user in making these authorizations is circumvented.

Figure 6:
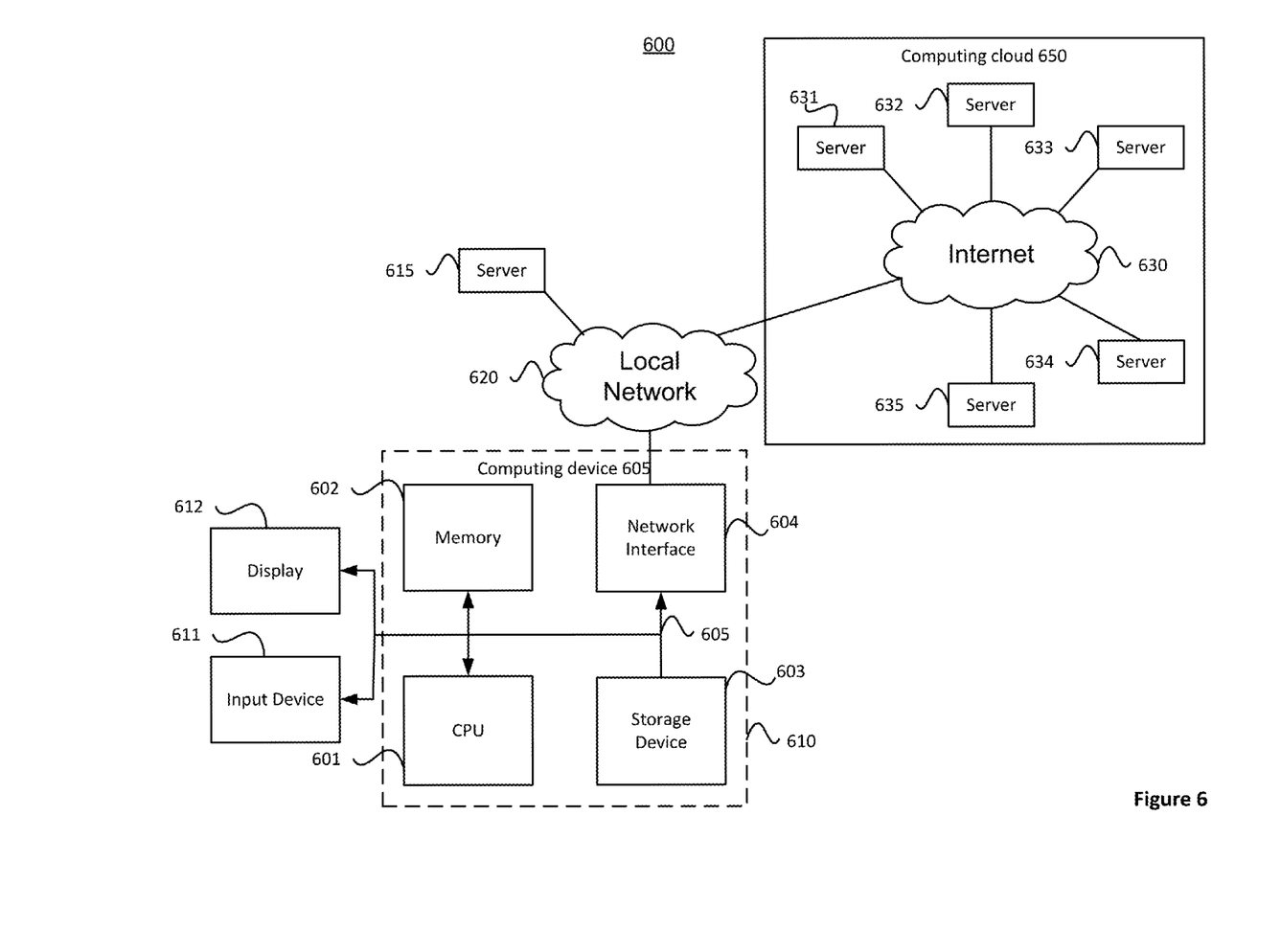
FIG. 6 is an example block diagram illustrating an example computing system for providing integrated role-based access control, in accordance with some implementations.

FIG. 6 is an example block diagram illustrating an example computing system for providing integrated role-based access control, in accordance with some implementations.

As shown in FIG. 6, in some implementations, the computing system 610 includes a bus 606 or other communication mechanism for communicating information, and a processor 601 coupled with the bus 605 for processing information. In some implementations, the computing system 610 also includes a memory 602 coupled to bus 606 for storing information and instructions to be executed by processor 601, including information and instructions for performing the techniques described above, for example. In some implementations, the memory 602 may also be used for storing variables or other intermediate information during execution of instructions to be executed by processor 601. In some implementations, the memory 602 includes, but is not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computing system can obtain information. In some implementations, the storage device 603 may include source code, binary code, or software files for performing the techniques above, for example. The storage device 603 and the memory 602 are both examples of computer readable mediums.

In some implementations, the computing system 610 may be coupled via the bus 606 to a display 612, such as a cathode ray tube (CRT) or liquid crystal display (LCD), for displaying information to a user. An input device 611 such as a keyboard and/or mouse is coupled to the bus 605 for communicating information and command selections from the user to the processor 601. The combination of these components allows the user to communicate with the computing system 610. In some systems, the bus 606 may be divided into multiple specialized buses.

In some implementations, the computing system 610 includes a network interface 604 coupled with the bus 605. In some implementations, the network interface 604 provides two-way data communications between the computing system 610 and the local network 620. In some implementations, the network interface 604 includes a digital subscriber line (DSL) or a modem to provide data communication connection over a telephone line, for example. Another example of the network interface 604 is a local area network (LAN) card to provide a data communication connection to a compatible LAN. Wireless links are another example. In any such implementation, the network interface 604 sends and receives electrical, electromagnetic, or optical signals that carry digital data streams representing various types of information.

In some implementations, the computing system 610 sends and receives information, including messages or other interface actions, through the network interface 604 across a local network 620, an Intranet, or the Internet 630. In some implementations, the local network, the computing system 610 communicates with a plurality of other computer machines, such as a server 615 or a computing cloud 650. In some implementations, the computing system 610 and server computer systems represented by the server 615 form a cloud computing network, which may be programmed with processes described herein. In the Internet example, software components or services may reside on multiple different computing systems 610 or servers 631-635 across the network. In some implementations, the processes described above are implemented at computing cloud 650, which includes one or more servers from the servers 631-635. In some implementations, the server 631 transmits actions or messages from one component, through the Internet 630, the local network 620, and the network interface 604 to a component of the computing system 610. In some implementations, the software components and processes described above are implemented on any computer system and send and/or receive information across a network.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first action could be termed a second action, and, similarly, a second action could be termed a first action, without changing the meaning of the description, so long as all occurrences of the "first action" are renamed consistently and all occurrences of the "second action" are renamed consistently. The first session and the second session are both actions, but they are not the action.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method using a computing device having one or more processors and memory storing one or more programs for execution by the one or more processors, the method comprising:
   identifying a request from a user, wherein the request comprises:
   an application-level request associated with a user role to access a first module of an enterprise application; and
   a separate database-level request associated with the user role to access a first portion of a database through the first module,
   wherein the database-level request includes parameters necessary for invoking one or more stored procedure calls to apply changes to a database table of the database;
   responsive to a first determination that, based on the user role, the application-level request by the user is permissible:
   granting the application-level request to access the first module in the enterprise application; and
   responsive to a second determination, different from the first determination, that based on the user role, the database-level request by the user is permissible:
   granting the database-level request to access the first portion of the database through the first module;
   wherein the user role is associated with a plurality of access permissions, and wherein each access permission in the plurality of access permissions specifies:
   an exhaustive set of application-level requests permitted for the user role; and
   an exhaustive set of database-level requests permitted for the user role,
   wherein the database-level request invokes the one or more stored database procedure calls from a database stored procedure calls module in communication with a database access control module of the database,
   wherein a database stored procedure call in the database stored procedure calls module is invoked through a synonym specified in the data request, and
   wherein an application program interface (API) associated with the database stored procedure calls module is accessible to the database-level request through the synonym to provide a security wall between the enterprise application and the database to avoid exposure of the API to the application-level request.

2. The method of claim 1, wherein a user request is granted if the user request corresponds to access permissions specified in the plurality of access permissions associated with the user role.

3. The method of claim 1, wherein a user request is denied if the user request does not corresponds to access permissions specified in the plurality of access permissions associated with the user role.

4. The method of claim 1, wherein the user role corresponds to a corporate role of the user in a business organization.

5. The method of claim 1, wherein the user role is customized in accordance with a set of business policies associated with a business organization.

6. The method of claim 1, wherein the user role is pre-configured for an end-user of the enterprise application.

7. The method of claim 1, wherein the user role is unmodifiable by an end-user of the enterprise application.

8. The method of claim 1, wherein the API associated with the database stored procedure calls module is not directly accessible to the database-level request.

9. The method of claim 8, wherein the API associated with the database stored procedure calls module is not accessible by a second user associated with a second user role.

10. The method of claim 8, wherein a first database schema is associated with a first set of tables, a first set of views, and a first set of stored procedures.

11. The method of claim 1, further comprising:
    responsive to a third determination that, based on the user role, the application-level request by the user is not permissible:
    denying the application-level request to access the first module in the enterprise application without processing the database-level request to access the first portion of the database through the first module.

12. The method of claim 11, further comprising logging the denial of the application request for auditing purpose.

13. The method of claim 1, wherein the enterprise application and the database are developed independently by different providers.

14. The method of claim 1 wherein access is implemented in an access control application associated with the enterprise application and the database.

15. The method of claim 1, wherein the user role is enabled in a plurality of enterprise applications associated with the database.

16. A non-transitory computer readable storage medium configured for storing one or more programs, the one or more programs comprising instructions, which when executed by a computing system with one or more processors, cause the computing system to execute a method comprising:
    identifying a request from a user, wherein the request comprises:
    an application-level request associated with a user role to access a first module of an enterprise application; and
    a separate database-level request associated with the user role to access a first portion of a database through the first module,
    wherein the database-level request includes parameters necessary for invoking one or more stored procedure calls to apply changes to a database table of the database;
    responsive to a first determination that, based on the user role, the application-level request by the user is permissible:
    granting the application-level request to access the first module in the enterprise application; and
    responsive to a second determination, different from the first determination, that based on the user role, the database-level request by the user is permissible:
    granting the database-level request to access the first portion of the database through the first module;
    wherein the user role is associated with a plurality of access permissions, and wherein each access permission in the plurality of access permissions specifies:
    an exhaustive set of application-level requests permitted for the user role; and
    an exhaustive set of database-level requests permitted for the user role,
    wherein the database-level request invokes the one or more stored database procedure calls from a database stored procedure calls module in communication with a database access control module of the database,
    wherein a database stored procedure call in the database stored procedure calls module is invoked through a synonym specified in the data request, and
    wherein an application program interface (API) associated with the database stored procedure calls module is accessible to the database-level request through the synonym to provide a security wall between the enterprise application and the database to avoid exposure of the API to the application-level request.

17. A computing system, comprising:
    one or more processors;
    memory; and
    one or more programs, wherein the one or more programs are stored in the memory and are configured to be executed by the one or more processors, the one or more programs including instructions for:
    identifying a request from a user, wherein the request comprises:
    an application-level request associated with a user role to access a first module of an enterprise application; and
    a separate database-level request associated with the user role to access a first portion of a database through the first module,
    wherein the database-level request includes parameters necessary for invoking one or more stored procedure calls to apply changes to a database table of the database;
    responsive to a first determination that, based on the user role, the application-level request by the user is permissible:
    granting the application-level request to access the first module in the enterprise application; and
    responsive to a second determination, different from the first determination, that based on the user role, the database-level request by the user is permissible:
    granting the database-level request to access the first portion of the database through the first module;
    wherein the user role is associated with a plurality of access permissions, and wherein each access permission in the plurality of access permissions specifies:
    an exhaustive set of application-level requests permitted for the user role; and
    an exhaustive set of database-level requests permitted for the user role,
    wherein the database-level request invokes the one or more stored database procedure calls from a database stored procedure calls module in communication with a database access control module of the database,
    wherein a database stored procedure call in the database stored procedure calls module is invoked through a synonym specified in the data request, and
    wherein an application program interface (API) associated with the database stored procedure calls module is accessible to the database-level request through the synonym to provide a security wall between the enterprise application and the database to avoid exposure of the API to the application-level request.

18. The method of claim 1 further comprising using a mapping table for corresponding parameters specified in the database-level request with parameters needed to invoke a stored procedure call.

19. The method of claim 1 wherein access permission determinations are made by an access control application independently from the enterprise application and the database for data security between the enterprise application and the database.

* * * * *